US011617014B2

(12) United States Patent
Venugopal et al.

(10) Patent No.: US 11,617,014 B2
(45) Date of Patent: Mar. 28, 2023

(54) CONTENT-AWARE PROGRESS BAR

(71) Applicant: AT&T Intellectual Property I, L.P., Atlanta, GA (US)

(72) Inventors: Megha Venugopal, Union City, CA (US); Binny Asarikuniyil, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/081,982

(22) Filed: Oct. 27, 2020

(65) Prior Publication Data
US 2022/0132215 A1 Apr. 28, 2022

(51) Int. Cl.
*H04N 21/472* (2011.01)
*H04N 21/845* (2011.01)

(52) U.S. Cl.
CPC . *H04N 21/47217* (2013.01); *H04N 21/47205* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2003/0067886 A1* | 4/2003 | Son | H04N 21/47205 370/260 |
| 2006/0206912 A1* | 9/2006 | Klarfeld | H04N 21/4823 725/39 |
| 2012/0159327 A1* | 6/2012 | Law | H04N 21/47217 715/716 |
| 2013/0263168 A1* | 10/2013 | Choi | H04N 21/252 725/14 |
| 2014/0189735 A1* | 7/2014 | Cudak | H04N 21/44004 725/38 |
| 2015/0332732 A1* | 11/2015 | Gilson | G10L 21/055 386/240 |
| 2017/0188116 A1* | 6/2017 | Major | H04N 21/4147 |
| 2019/0180790 A1* | 6/2019 | Rehman | G06F 3/04842 |
| 2020/0097731 A1* | 3/2020 | Gupta | G06K 9/00744 |
| 2020/0275158 A1* | 8/2020 | Gaur | H04N 21/26603 |

* cited by examiner

*Primary Examiner* — Heather R Jones (57) ABSTRACT

In one example, a method for providing content-aware progress bar includes receiving a command from a user via an input device to present a visual media on a display device, retrieving a progress bar associated with the visual media, wherein the progress bar includes a plurality of sections, and where each section of the plurality of sections corresponds to one scene of a plurality of scenes of the visual media, and wherein the each section visually indicates a type of content contained in the one scene, a location of the one scene in the visual media, and a duration of the one scene, presenting the visual media on the display device, and displaying the progress bar on the display device in a manner that is time-synchronized to the visual media.

20 Claims, 4 Drawing Sheets

CONTENT-AWARE PROGRESS BAR

The present disclosure relates generally to digital media distribution, and relates more particularly to devices, non-transitory computer-readable media, and methods for providing a content-aware progress bar to notify viewers of the content of upcoming scenes of a visual media.

BACKGROUND

Television service providers, including providers of cable television services, satellite television services, fiber optic television services, digital streaming television services, and the like, typically include content warnings with programs (e.g., television shows, films, or the like). The content warnings notify users of the types of content contained within a program for which the users may want warning, such as violence, explicit language, adult content, and the like.

SUMMARY

In one example, a method for providing content-aware progress bar includes receiving a command from a user via an input device to present a visual media on a display device, retrieving a progress bar associated with the visual media, wherein the progress bar includes a plurality of sections, and where each section of the plurality of sections corresponds to one scene of a plurality of scenes of the visual media, and wherein the each section visually indicates a type of content contained in the one scene, a location of the one scene in the visual media, and a duration of the one scene, presenting the visual media on the display device, and displaying the progress bar on the display device in a manner that is time-synchronized to the visual media.

In another example, a device includes a processing system including at least one processor and a computer-readable medium storing instructions which, when executed by the processing system, cause the processing system to perform operations. The operations include receiving a command from a user via an input device to present a visual media on a display device, retrieving a progress bar associated with the visual media, wherein the progress bar includes a plurality of sections, and where each section of the plurality of sections corresponds to one scene of a plurality of scenes of the visual media, and wherein the each section visually indicates a type of content contained in the one scene, a location of the one scene in the visual media, and a duration of the one scene, presenting the visual media on the display device, and displaying the progress bar on the display device in a manner that is time-synchronized to the visual media.

In another example, a computer-readable medium stores instructions which, when executed by a processing system including at least one processor, cause the processing system to perform operations. The operations include receiving a command from a user via an input device to present a visual media on a display device, retrieving a progress bar associated with the visual media, wherein the progress bar includes a plurality of sections, and where each section of the plurality of sections corresponds to one scene of a plurality of scenes of the visual media, and wherein the each section visually indicates a type of content contained in the one scene, a location of the one scene in the visual media, and a duration of the one scene, presenting the visual media on the display device, and displaying the progress bar on the display device in a manner that is time-synchronized to the visual media.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a content-aware progress bar to notify viewers of the content of upcoming scenes of a visual media. As discussed above, television service providers, including providers of cable television services, satellite television services, fiber optic television services, digital streaming television services, and the like, typically include content warnings with programs (e.g., television shows, films, or the like). The content warnings notify users of the types of content contained within a program for which the users may want warning, such as violence, explicit language, adult content, and the like.

Although these content warnings may provide some advance insight into the forthcoming content, the warnings are often vague. For instance, a warning that advises of explicit language typically does not specify when in the program the explicit language occurs (e.g., if there is explicit language throughout the program, only in one scene near the end, etc.). Moreover, the content warnings are often displayed at the beginning of the program, but may not be displayed again. Thus, a user may forget that an upcoming scene includes content for which a warning was provided.

Examples of the present disclosure provide a content-aware progress bar. Unlike a conventional progress bar, which typically displays only the playback progress of the program being viewed (e.g., how much of the program has been viewed, how much of the program is left to view, etc.), the present content-aware progress bar also indicates the types of content contained in the program, the relative locations of the types of content in the playback, and the durations of the scenes containing the types of content. In one example, the content-aware progress bar may display different types of content in different colors or patterns (e.g., red for violence, blue for explicit language, etc.), so that it is easy for a user to tell when scenes containing certain types of content are coming up. In further examples, the present content-aware progress bar may be interactive. For instance, a user may be able to click on a portion of the content-aware progress bar to skip over or skip to a particular scene.

Within the context of the present disclosure, the term "scene" is understood to refer to a sequence of frames of a media, such as a television show, a film, an advertisement, a user-generated video, or the like. The scene may be defined by a type of content that is common to the corresponding sequence of frames. For instance, a given sequence of frames may, when viewed in sequence, form an action scene, a comedic scene, a romantic scene, or the like.

Moreover, although examples of the present disclosure are discussed within the context of visual media, it will be appreciated that the content-aware progress bar disclosed herein could be used with non-visual media as well. For instance, a content-aware progress bar could be used to alert a user to upcoming scenes of an audiobook, a podcast, or another type of media. Furthermore, it should be noted that although the disclosure is described as a content-aware progress "bar," other types of graphics (i.e., other than bars, e.g., a non-uniform or non-linear line, a circle, a cylinder, an hourglass, etc.) can be used to show the progress of a visual media in a content-aware manner and are to be interpreted in this disclosure as being covered by the term "bar." In other words, content-aware progress "bar" encompasses any content-aware progress "visual graphics" that perform the same functionalities as discussed below.

Figure 1:
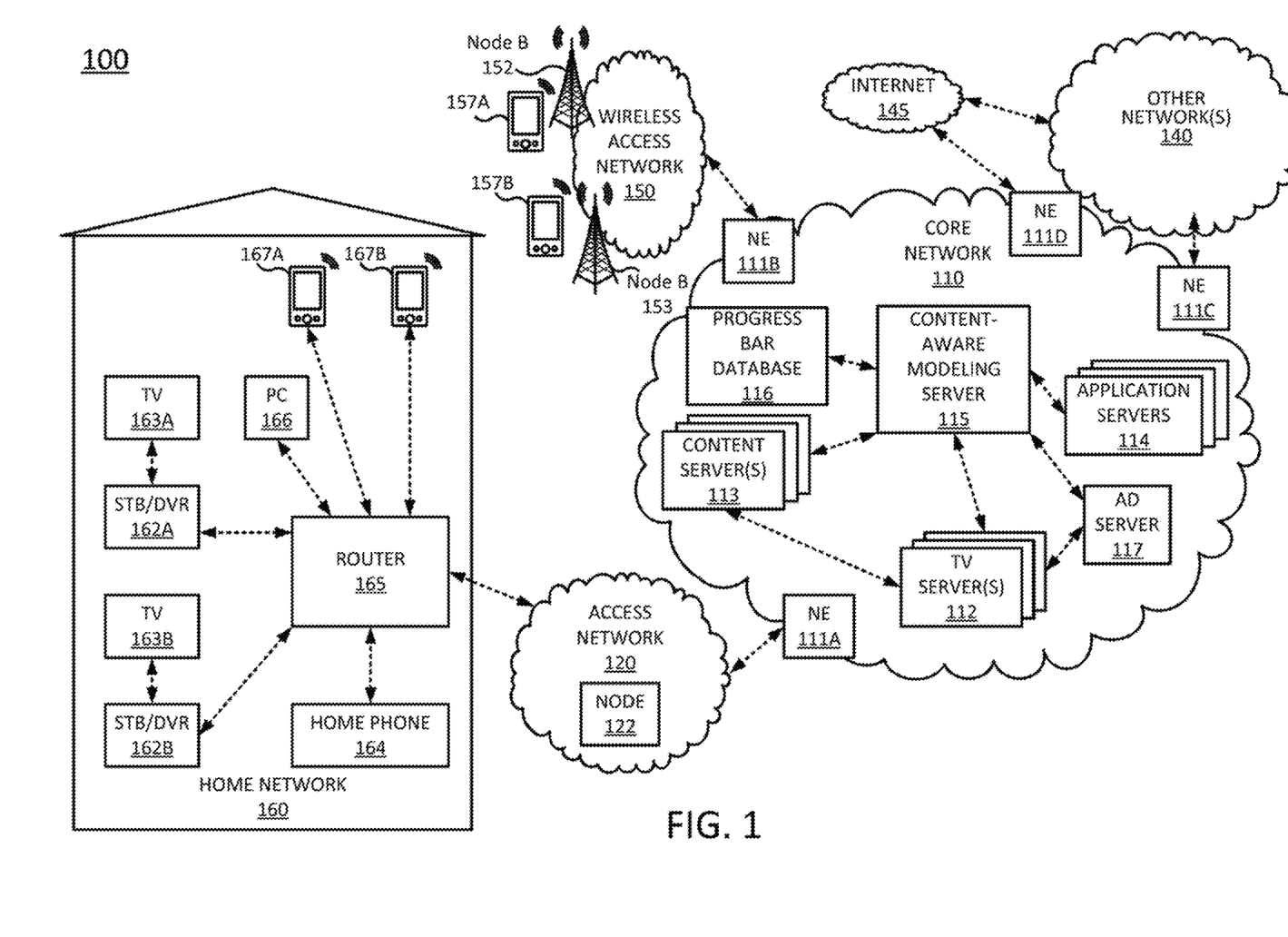
FIG. 1 illustrates an example network related to the present disclosure.

To better understand the present disclosure, FIG. 1 illustrates an example network 100 related to the present disclosure. As shown in FIG. 1, the network 100 may comprise a content distribution network (e.g., data network) that connects mobile devices 157A, 157B, 167A and 167B, and devices such as set-top boxes (STBs) 162A, and 162B, television (TV) 163A and TV 163B, router 165, personal computer (PC) 166, and so forth, with one another and with various other devices via a core network 110, a wireless access network 150 (e.g., a cellular network), an access network 120, other networks 140 and/or the Internet 145. Mobile devices 157A, 157B, 167A and 167B, and devices such as set-top boxes (STBs) 162A, and 162B, television (TV) 163A and TV 163B, router 165, and personal computer (PC) 166 may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a portable gaming device, a wearable smart device (e.g., a smart watch or a fitness tracker), a satellite radio receiver or satellite television receiver, or any other device having a user interface that is capable of receiving bandwidth from the network 100 in the form of streaming data. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a television content distribution application that allows the user of the mobile device to access digital television content such as television shows, movies, video on demand programs, and the like from his or her television content provider (e.g., a cable television service provider, a satellite television service provider, etc.).

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services.

Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a content-aware modeling server 115, and a content-aware progress bar database (DB) 116. For ease of illustration, various additional elements of core network 110 are omitted from FIG. 1.

With respect to television service provider functions, core network 110 may include one or more third party television (TV) servers 112 for the delivery of television content. In this regard, television servers 112 may interact with content servers 113 and advertising server 117 to select which video programs, or other content and advertisements to provide to the home network 160, to the mobile devices 157A, 157B, 167A, and 167B, and to other downstream viewing locations.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

The content-aware modeling server 115 performs operations, discussed in greater detail below in connection with FIG. 3, related to presenting a content-aware progress bar.

For example, the content-aware modeling server 115 may analyze metadata associated with a visual media (e.g., a program stored in one of the TV servers 112, content servers 113, application servers 114, ad server 117, or the like) in order to identify scenes of the visual media that contain certain types of content, such as violence, explicit language, adult content, action sequences, comedic sequences, romantic sequences, sad sequences, scary sequences, gory sequences, and the like. For instance, scene-based metadata generated during encoding of the visual media may indicate the frame numbers or time stamps of the visual media that are associated with different types of content, which may help the content-aware modeling server 115 to delineate between different types of scenes (e.g., a violent scene may last from frame 300 to frame 900, or from time stamp 3:10 to time stamp 3:35).

Based on the analyzed metadata, the content-aware modeling server 115 may construct a content-aware progress bar for the visual media, where the content-aware progress bar may indicate, for at least one scene or portion of the visual media, a type of content contained in the scene, a location of the scene in the visual media and the duration of the scene.

Figure 2:
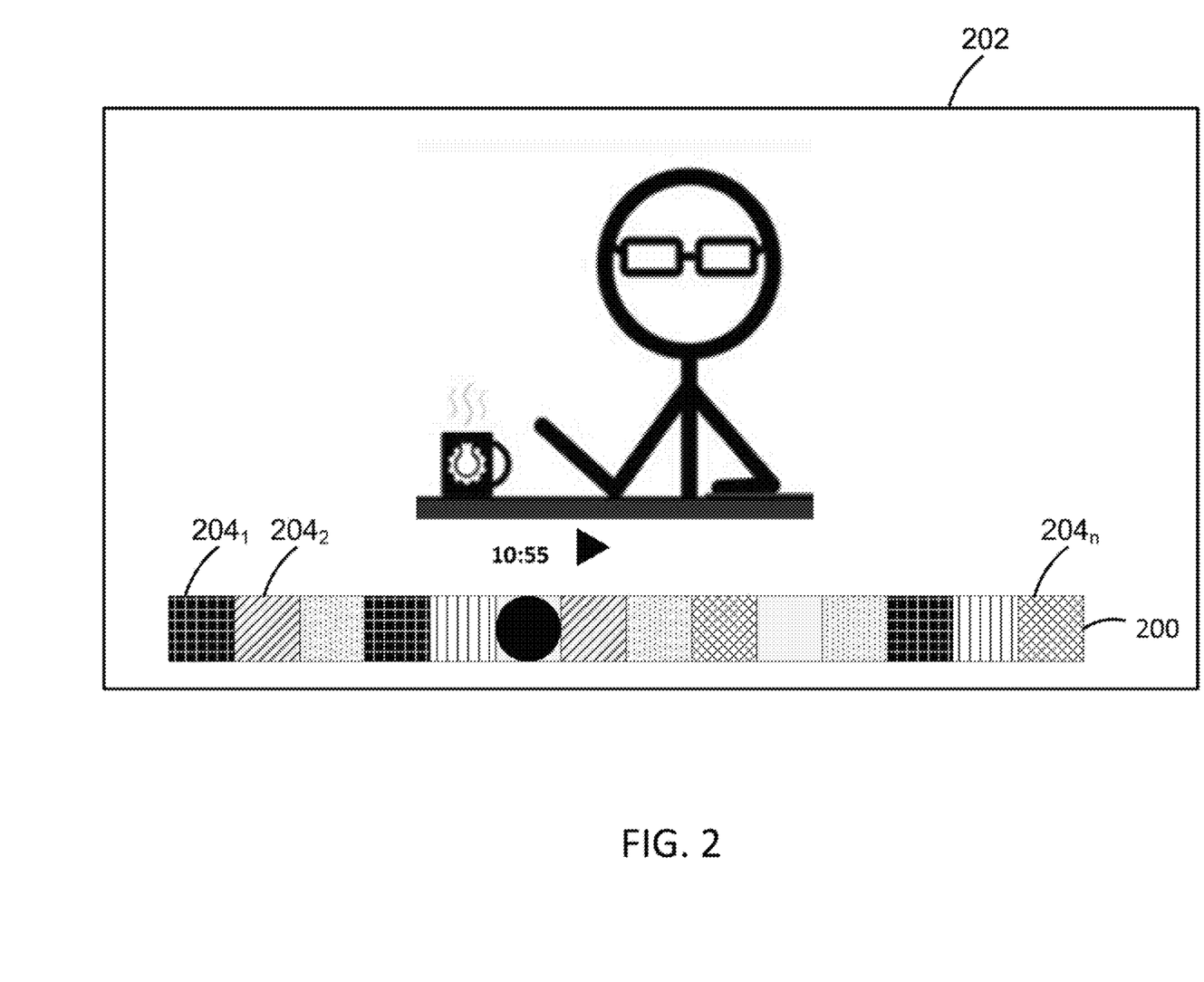
FIG. 2 illustrates an example content-aware progress bar that may be associated with a visual media, one frame of which is illustrated in FIG. 2.

FIG. 2, for instance, illustrates an example content-aware progress bar 200 that may be associated with a visual media, one frame 202 of which is illustrated in FIG. 2. As shown, the content-aware progress bar 200 may be divided into a plurality of sections $204_1$-$204_n$ (hereinafter individually referred to as a "section 204" or collectively referred to as "sections 204"). Each section 204 of the plurality of sections 204 may represent a particular scene of the visual media. Furthermore, the size of each section 204 may be rendered to indicate the duration of the corresponding scene e.g., sections 204 corresponding to longer scenes or sequences may be larger that sections 204 corresponding to shorter scenes or sequences). Additionally, each section 204 may be rendered with a visual indication that corresponds to a type of content contained in the corresponding scene. As discussed above, different colors, patterning, images, or other graphics may correspond (e.g., in a key) to different types of content. For instance, the color red may correspond to violent content, the color blue may correspond to content that includes explicit language, and so on. The sections 204 may be ordered to show the order in which the corresponding scenes or sequences of frames occur in the visual media.

The content-aware modeling server 115 may store the content-aware progress bars in the progress bar DB 116, where the progress bar DB 116 may store a plurality of content-aware progress bars for a plurality of visual media. The content-aware progress bars stored in the progress bar DB 116 may be indexed according to the visual media to which the content-aware progress bars correspond. For instance, a lookup table may indicate a location in storage (e.g., in the progress bar DB 116) at which a content-aware progress bar corresponding to a particular visual media resides.

Figure 4:
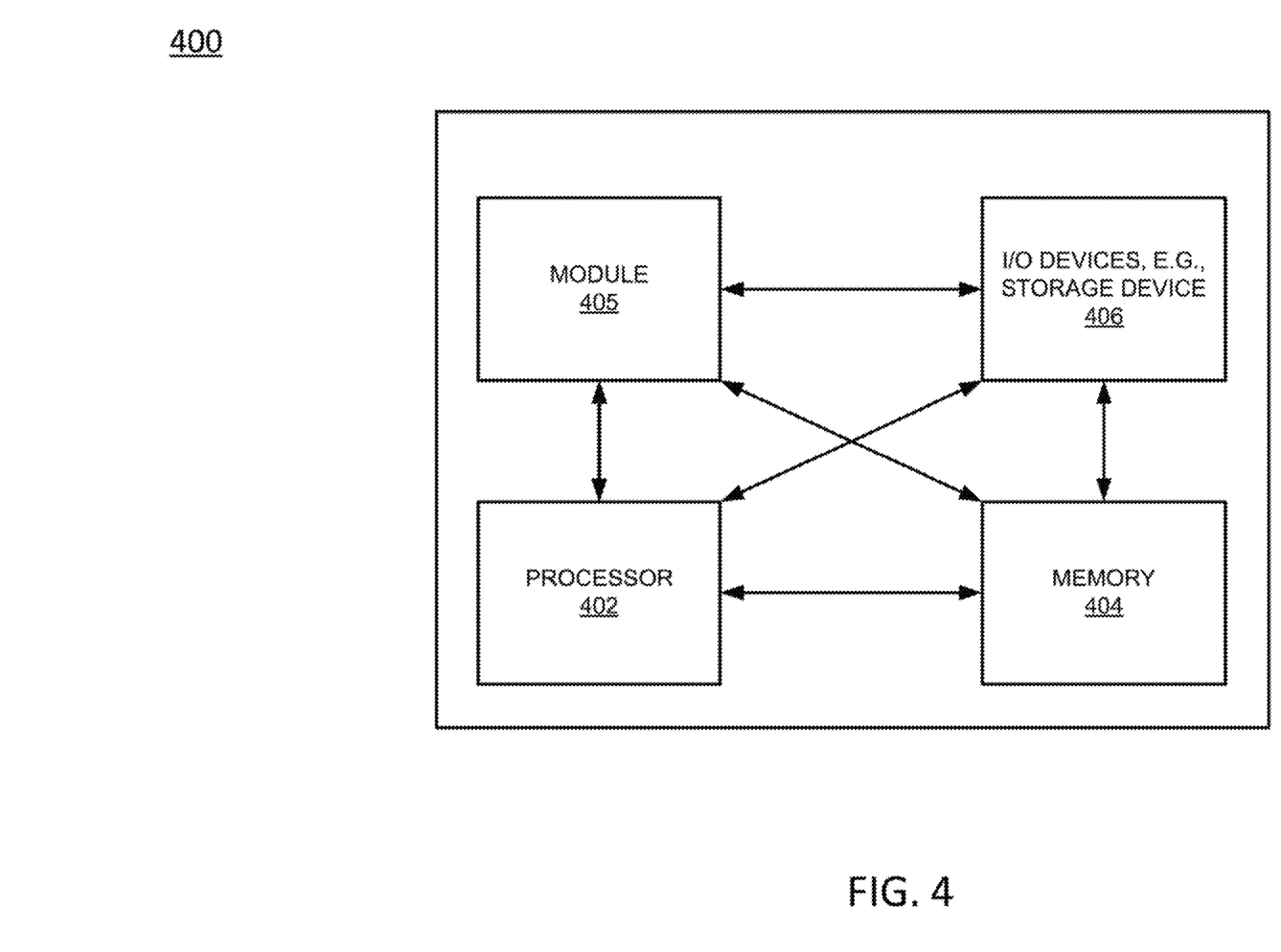
FIG. 4 depicts a high-level block diagram of a computing device specifically programmed to perform the functions described herein.

In one example, any or all of the television servers 112, content servers 113, application servers 114, content-aware modeling server 115, and advertising server 117 may comprise a computing system, such as computing system 400 depicted in FIG. 4.

In one example, the access network 120 may comprise a Digital Subscriber Line (DSL) network, a Local Area Network (LAN), a cellular or wireless access network, a 3$^{rd}$ party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to communications with web servers via the Internet 145 and/or other networks 140, and so forth.

In one example, home network 160 may include a router 165, which receives data/communications associated with different types of media, e.g., television, phone, and Internet, and separates these communications for the appropriate devices. The data/communications may be received via access network 120, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. Each of these devices may be configured to support media content of particular file formats. In one example, router 165 may further communicate with TV (broadly a display) 163A and/or 163B, e.g., where one or both of the televisions is a smart TV. TVs 163A and/or 163B may also be configured to support media content of particular file formats. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

One or more of the mobile devices 157A, 157B, 167A, and 167B; STBs 162A and 162B; TVs 163A and 163B; router 165; or PC 166 may be capable of receiving and/or displaying television content, e.g., as delivered by the TV server 112. For instance, one or more of the mobile devices 157A, 157B, 167A, and 167B or PC 166 may execute an application associated with a television service provider. The application may allow a user to access a subscriber account associated with the television service provider via the mobile device(s), so that the user may watch television programming on the mobile device(s). STBs 162A and 162B or router 165 may receive signals from the TV servers 112 and extract television programming from the signals for display on the TVs 163A and 163B. Alternatively, if one of the TVs 163A and 163B is a smart television, the TV(s) may be able to directly receive the signals from the TV servers 112 and extract the television programming.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 3:
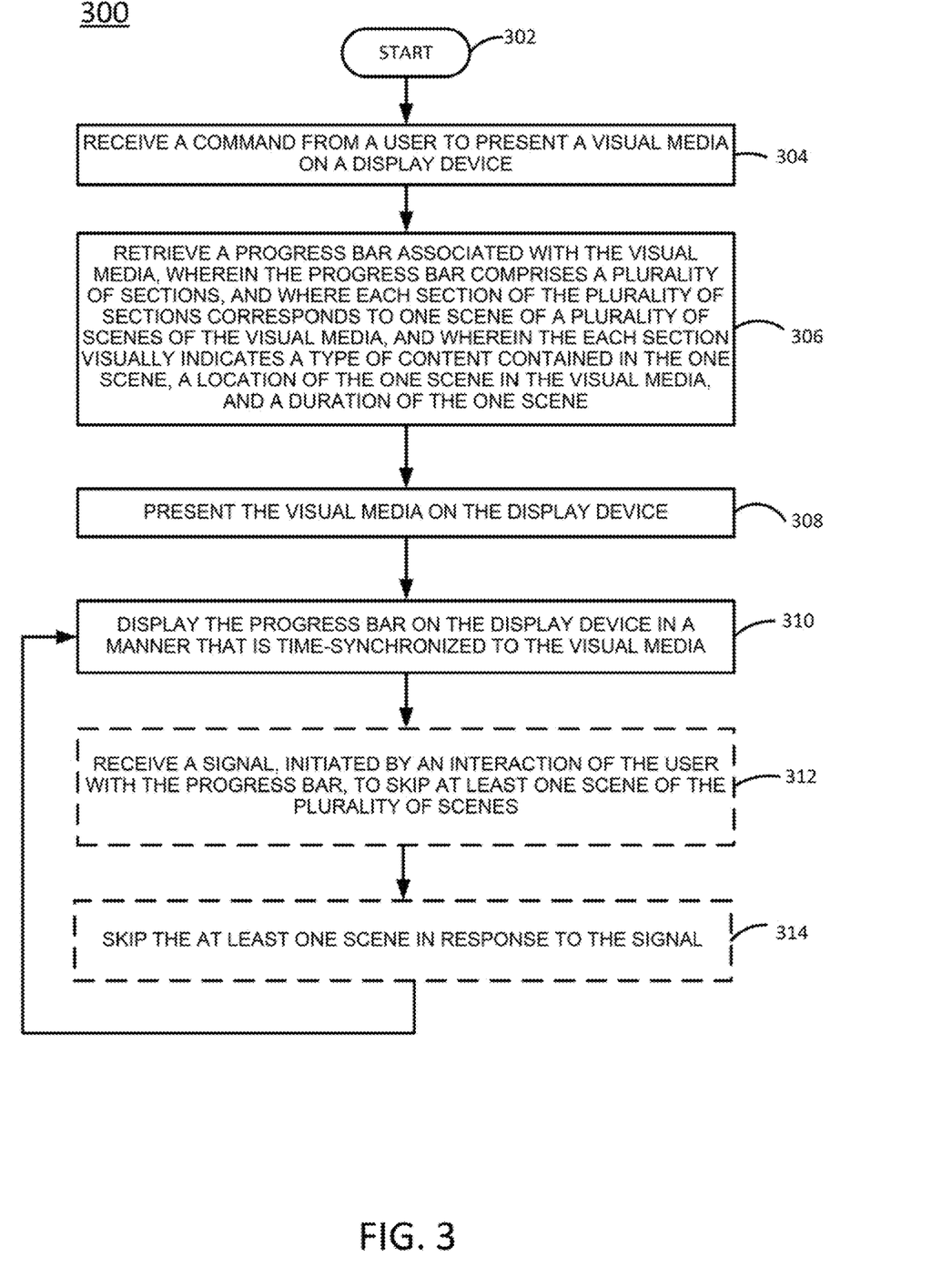
FIG. 3 illustrates a flowchart of an example method for providing a content-aware progress bar, according to the present disclosure.

To further aid in understanding the present disclosure, FIG. 3 illustrates a flowchart of an example method 300 for providing a content-aware progress bar, according to the present disclosure. In one example, the method 300 may be performed by a user endpoint device (e.g., one or more of the mobile devices 157A, 157B, 167A, and 167B; STBs 162A and 162B; TVs 163A and 163B; router 165; or PC 166 and/or additional devices illustrated in FIG. 1). In this case, the user endpoint device may retrieve visual media and corresponding progress bars from a network (e.g., from core network 110 of FIG. 1) for local presentation. In another example, an application server in a network (e.g., AS 114 of FIG. 1) may retrieve visual media and corresponding progress bars, and send commands to a user endpoint device that cause the user endpoint device to present the visual media and progress bar.

However, in other examples, the method 300 may be performed by another device or devices, such as the computing device 400 illustrated in FIG. 4. As such, any references in the discussion of the method 300 to components of FIG. 1 are not intended to limit the means by which the method 300 may be performed. For the sake of example, the method 300 is described as being performed by a processing system including at least one processor.

The method 300 begins in step 302. In step 304, the processing system may receive a command from a user via an input device (e.g., any of the user endpoint devices discussed above or an input component (e.g., a key pad, a remote controller, a camera for recognizing user gestures, a microphone for recognizing verbal commands, and so on) that is part of the display device, smart TV, set-top box and so on) to present a visual media on a display device. In one example, the command may take the form of an action that turns on or changes the channel of a television. In another example, the command may take the form of a command to begin playing the visual media (e.g., pressing play on a remote control that communicates with a television or set top box; pressing play on a smart phone, a tablet computing device, or the like which executes a streaming video application; pressing a button to indicate a selection of a video on demand program, etc.). In one example, the command identifies the visual media to be presented (e.g., a television show, a film, a user-generated video, a video game, etc.). The visual media may be a visual media that is already in progress (e.g., a television show that has already started) or a visual media that is to be played back from the beginning (e.g., a film selected on a streaming video application).

In step 306, the processing system may retrieve a progress bar associated with the visual media, wherein the progress bar comprises a plurality of sections, and where each section of the plurality of sections corresponds to one scene of a plurality of scenes of the visual media, and wherein the each section visually indicates a type of content contained in the one scene, a location of the one scene in the visual media, and a duration of the one scene. The progress bar may be retrieved, for instance, from a database that stores a plurality of progress bars, where each progress bar of the plurality of progress bars corresponds to one instance of visual media (e.g., to one episode of a television show, one film, one user-generated video, etc.). For instance, an identifier associated with the visual media (e.g., a title, a season and episode number, a numeric or alphanumeric identifier, and/or the like) may be used to look up an identifier for a corresponding progress bar in the database.

As discussed above, the progress bar may comprise a plurality of sections. Each section may represent a particular scene of the visual media. Furthermore, the size of each section may be rendered to indicate the duration of the corresponding scene. Additionally, each section may be rendered with a visual indication that corresponds to a type of content contained in the corresponding scene. As discussed above, different colors, patterning, images, or other graphics may correspond to different types of content. For instance, the color red may correspond to violent content, the color blue may correspond to content that includes explicit language, and so on.

In one example, the appearances of the sections, and a key that maps appearance to content type, may be configurable by the user. For instance, the user may select which colors, patterns, images, other graphics, or the like correspond to which types of content. This may make is easier for the user to identify the types of upcoming content at a quick glance. For instance, the user may not mentally associate the color red with violence, but may easily recognize that the letter "V" indicates violent content. The user may also choose which types of content to include visual indications for in the progress bar. For instance, a user may not want warnings for explicit language, but may wish to be warned when an upcoming scene contains graphic violence.

The sections of the progress bar may be ordered to show the order in which the corresponding scenes occur in the visual media. Thus, for example, if a long comedic scene is immediately followed by a short violent scene, the progress bar may include a large blue section to represent the comedic scene, immediately followed by (or adjacent to) a small red section to indicate the violent scene. Thus, different sections representing different scenes may be concatenated together in the order of the represented scenes in order to form the progress bar.

In step 308, the processing system may present the visual media on the display device. For instance, the processing system may retrieve the visual media from a television server, an application server, a content server, an advertisement server, or the like over a network. The processing system may then present the visual media on the display device, so that the visual media plays back and is visible on the display of the display device. In one example, the processing system may begin presenting the visual media from the beginning of the visual media (e.g., where the visual media may be a video on demand program). However, in another example, the processing system may begin presenting the visual media from somewhere after the beginning of the visual media (e.g., where the visual media may be an in-progress television show).

In step 310, the processing system may display the progress bar on the display device in a manner that is time-synchronized to the visual media. For instance, the processing system may identify a time point in the visual media that is currently being (or is about to be) presented. The time point may be identified, for example by a number or a time stamp of a frame of the visual media that is currently being presented. The processing system may then identify a time point in the progress bar that matches the time point in the visual media, where the matching time point in the progress bar may be identified by the number or time stamp of the corresponding frame of the visual media. The processing system may then begin displaying the progress bar, from the time point on the progress bar that corresponds to the current time point of the visual media.

The appearance of the progress bar may be continuously updated as the visual media is presented. For instance, once the visual media and the progress bar have been time-synchronized, presentation of both the visual media and the progress bar may proceed in a linear manner, so that the progress bar always presents an up-to-date visual indication of the types of content that are upcoming in the visual media. In one example, the progress bar may include a visual indicator to show the current time point on the progress bar. For instance, a marker (such as a dot, an arrow, or any other shapes) may move continuously along the progress bar, where the position of the marker on the progress bar corresponds to the current time point of the visual media. In a further example, sections of the progress bar that correspond to scenes of the visual media that have already elapsed or been presented may be grayed out or may appear to be faded or lighter relative to sections of the progress bar that correspond to scenes of the visual media that have not yet been presented.

In one example, the progress bar may be displayed continuously on the display device (e.g., the progress bar is always there). However, some users may find the constant presence of a progress bar to be distracting. Thus, in other examples, the progress bar may be displayed only when a change in the type of content is coming up (e.g., x seconds before a scene containing a new type of content begins), and may be hidden at all other times. In a further example still, the progress bar may be displayed only when the change in the type of content indicates that a type of content for which the user has requested notifications (e.g., violence, explicit language, etc.) is coming up. In one example, the user may dismiss the content bar (e.g., make the content bar hidden) at any time. However, the user may also request that a hidden progress bar be displayed at any time.

In optional step 312 (illustrated in phantom), the processing system may receive a signal via the input device, initiated by an interaction of the user with the progress bar, to skip at least one scene of the plurality of scenes. For instance, by examining the progress bar, the user may be able to tell that an upcoming scene contains content that the user would prefer not to see. In this case, the user may interact with the progress bar to indicate the at least one scene that should be skipped. For instance, the user may manipulate a graphical user interface to click on a section of the progress bar that corresponds to the at least one scene to be skipped. The processing system may present a dialog to confirm the user's selection (e.g., "Skip this scene? Y/N").

In optional step 314 (illustrated in phantom) the processing system may skip the at least one scene in response to the signal received in step 312. For instance, the processing system may omit playback of the at least one scene or may speed up playback of the visual media until reaching a scene occurring immediately after the at least one scene. In an alternative example, however, the processing system may not be able to skip or speed up playback (for instance, the processing system may not be able to speed up playback of an in-progress television show). In this case, the processing system may take other steps to conceal the content of the at least one scene. For instance, the processing system may blur the images of the at least one scene, may mute or lower the volume of the at least one scene, may scramble the audio of the at least one scene (e.g., distort the audio by speeding the audio up, slowing the audio down, adding noise, etc.), or the like.

The method 300 may return to step 310, and the processing system may continue to display the progress bar on the display device in a manner that is time-synchronized to the visual media. In other words, the processing system may continue to display the progress bar until such time as the user sends a signal to dismiss the progress bar, to pause or end presentation of the visual media, to power down the display device, or the like. In one example, if the display device should begin to present a new visual media (e.g., either in response to a user command to change the channel or present the new visual media, or in response to a first television program ending and a second television program beginning on the same channel), then the method 300 may return to step 304 so that a progress bar for the new visual media may be retrieved and time-synchronized to the new visual media.

Thus examples of the present disclosure provide advance notice to a user of the types of content that are upcoming in a visual media, so that the user can quickly and easily determine what types of content are to be displayed and when the types of content are to be displayed. This may allow the user to skip over or otherwise conceal scenes of the visual media that the user may not wish to see or hear, before the scenes are presented.

The content-aware progress bar of the present disclosure may be integrated into a parental control feature. For example, a user may configure the content-aware progress bar so that the processing system automatically skips scenes of a visual media that correspond to specific sections of the content-aware progress bar. For instance, the user may configure the content-aware progress bar with instructions that cause the processing system to skip every scene that corresponds to a section of the content-aware progress bar indicating explicit language.

In further examples, the processing system may learn that the user will, more often than not, use the content-aware progress bar to skip certain types of scenes (e.g., violent scenes). In these cases, the processing system may configure all content-aware progress bars for the user so that scenes corresponding to sections of the content-aware progress bars that indicate these certain types of scenes can be automatically skipped or marked to be skipped. In one example, the processing system may learn a time dependency that is associated with a user's tendency to skip certain types of scenes. For instance, a user may, more often than not, use the content-aware progress bar to skip violent scenes of visual media before 10:00 PM. However, after 10:00 PM, the user may, more often than not, allow the violent scenes to play. Thus, the processing system may learn to configure content-aware progress bars for the user to automatically skip violent scenes before 10:00 PM, but not after 10:00 PM (e.g., possibly due to the potential presence of young children prior to 10:00 PM and so on). The user may still choose to skip violent scenes after 10:00 PM on a case-by-case basis (e.g., in accordance with the method 300).

Furthermore, even where the content-aware progress bar may be configured to cause certain types of scenes to be automatically skipped, the processing system may still present a dialog to the user to notify the user that an upcoming scene is about to be skipped. For instance, the dialog may indicate that an upcoming scene is going to be automatically skipped, indicate the reason for the upcoming scene being skipped (e.g., violence, explicit language, etc.), and ask the user to confirm whether the upcoming scene should be skipped as planned. Thus, the user may confirm or override the instruction to automatically skip the upcoming scene. In one example, however, the processing system may require the user to enter a passcode in order to override the instruction to automatically skip the upcoming scene. This may ensure, for instance, that a child is not able to circumvent any parental control features that have been configured to operate in conjunction with the content-aware progress bar.

In further examples, the processing system may automatically configure a content-aware progress bar on-the-fly to skip certain types of scenes. The decision to skip certain types of scenes may be based on one or more viewing conditions at the time that a visual media is to be presented. For instance, the viewing conditions may include the number of people watching, the ages of the people watching, the day of the week (e.g., weekday versus weekend), whether a holiday or special event is currently in process (e.g., Thanksgiving, football playoffs), and/or other conditions. In one example, some of the viewing conditions, such as the number and/or ages of people watching, may be determined using information from one or more sensors in the viewing location. For instance, the processing system may communicate with one or more cameras, audio sensors, or other types of sensors that are integrated into the display device, or into Internet of Things devices in the vicinity of the display device (e.g., in the user's home) that can provide sensor data to the processing system.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, a user endpoint device or application server could be implemented as illustrated in FIG. 4.

As depicted in FIG. 4, the system 400 comprises a hardware processor element 402, a memory 404, a module 405 for providing a content-aware progress bar, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing a content-aware progress bar may include circuitry and/or logic for performing special purpose functions relating to modeling a pool of media content and available transcoding resources and to optimization allocation of the available transcoding resources among the pool of media content. The input/output devices 406 may include, for example, a camera, a video camera, storage devices (including but not limited to, a tape drive, a floppy drive, a hard disk drive or a compact disk drive), a receiver, a transmitter, a display, an output port, a television tuner card, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing a content-aware progress bar (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing a content-aware progress bar (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   receiving, by a processing system including at least one processor, a command from a user via an input device to present a visual media on a display device;
   retrieving, by the processing system, a progress bar associated with the visual media, wherein the progress bar comprises a plurality of sections, and where each section of the plurality of sections corresponds to one scene of a plurality of scenes of the visual media, and wherein the each section visually indicates a type of content contained in the one scene, a location of the one scene in the visual media, and a duration of the one scene;
   presenting, by the processing system, the visual media on the display device;
   displaying, by the processing system, the progress bar on the display device in a manner that is time-synchronized to the visual media, wherein the displaying is performed when a change in the type of content is coming up in the visual media within a predefined period of time, wherein the progress bar is hidden at all other times;
   learning, by the processing system based on an interaction of the user with the progress bar, a time dependency associated with a tendency of the user to skip scenes of a particular type; and
   configuring, by the processing system in response to the learning, another progress bar associated with another visual media to automatically skip scenes of the particular type when a time at which the another visual media is viewed by the user matches the time dependency.

2. The method of claim 1, wherein the plurality of sections is ordered in the progress bar according to an order in which the plurality of scenes occur in the visual media.

3. The method of claim 1, wherein the each section visually indicates the type of content contained in the one scene by displaying a color that corresponds to the type of content in the key.

4. The method of claim 1, wherein the each section visually indicates the type of content contained in the one scene by displaying a pattern that corresponds to the type of content in the key.

5. The method of claim 1, wherein the each section visually indicates the type of content contained in the one scene by displaying an image that corresponds to the type of content in the key.

6. The method of claim 1, wherein the each section visually indicates the duration of the one scene by a size of the each section.

7. The method of claim 1, wherein the learning comprises:
   receiving, by the processing system, a signal via the input device to skip at least one scene of the plurality of scenes that is of the particular type, wherein the signal is initiated by the interaction of the user with the progress bar.

8. The method of claim 7, further comprising:
   skipping, by the processing system, the at least one scene in response to the signal.

9. The method of claim 8, wherein the skipping comprises fast forwarding through the at least one scene.

10. The method of claim 7, wherein the processing system presents a dialog to the user to confirm that the at least one scene should be skipped after receiving the signal but prior to the skipping.

11. The method of claim 7, further comprising:
    blurring, by the processing system, frames of the at least one scene in response to the signal.

12. The method of claim 7, further comprising:
    muting, by the processing system, audio of the at least one scene in response to the signal.

13. The method of claim 7, further comprising:
    scrambling, by the processing system, audio of the at least one scene in response to the signal by altering a playback speed of the audio.

14. The method of claim 1, further comprising:
    updating, by the processing system, an appearance of the progress bar on the display device as the visual media is presented, so that the appearance of the progress bar on the display device indicates a current scene of the plurality of scenes that is currently being presented on the display device.

15. The method of claim 1, further comprising:
    hiding, by the processing system, the progress bar in response to a request from the user via the input device.

16. The method of claim 1, wherein the progress bar is configured to display visual indicators for a type of content for which the user indicates a desire to be warned and to omit visual indicators for a type of content for which the user indicates a desire to not be warned.

17. The method of claim 1, wherein the another progress bar associated with the another visual media is configured to present a dialog to the user to indicate that an upcoming scene of the particular type in the another visual media is to be skipped prior to skipping the upcoming scene of the particular type during the playback.

18. The method of claim 17, wherein the dialog presents an option to enter a passcode to prevent the upcoming scene of the particular type from being skipped during the playback.

19. A device comprising:
    a processing system including at least one processor; and
    a computer-readable medium storing instructions which, when executed by the processing system, cause the processing system to perform operations, the operations comprising:
      receiving a command from a user via an input device to present a visual media on a display device;
      retrieving a progress bar associated with the visual media, wherein the progress bar comprises a plurality of sections, and where each section of the plurality of sections corresponds to one scene of a plurality of scenes of the visual media, and wherein the each section visually indicates a type of content contained in the one scene, a location of the one scene in the visual media, and a duration of the one scene;

presenting the visual media on the display device;

displaying the progress bar on the display device in a manner that is time-synchronized to the visual media, wherein the displaying is performed when a change in the type of content is coming up in the visual media within a predefined period of time, wherein the progress bar is hidden at all other times;

learning, based on an interaction of the user with the progress bar, a time dependency associated with a tendency of the user to skip scenes of a particular type; and configuring, in response to the learning, another progress bar associated with another visual media to automatically skip scenes of the particular type when a time at which the another visual media is viewed by the user matches the time dependency.

20. A non-transitory computer-readable medium storing instructions which, when executed by a processing system including at least one processor, cause the processing system to perform operations, the operations comprising:

receiving a command from a user via an input device to present a visual media on a display device;

retrieving a progress bar associated with the visual media, wherein the progress bar comprises a plurality of sections, and where each section of the plurality of sections corresponds to one scene of a plurality of scenes of the visual media, and wherein the each section visually indicates a type of content contained in the one scene, a location of the one scene in the visual media, and a duration of the one scene;

presenting the visual media on the display device;

displaying the progress bar on the display device in a manner that is time-synchronized to the visual media, wherein the displaying is performed when a change in the type of content is coming up in the visual media within a predefined period of time;

learning, based on an interaction of the user with the progress bar, a time dependency associated with a tendency of the user to skip scenes of a particular type; and configuring, in response to the learning, another progress bar associated with another visual media to automatically skip scenes of the particular type when a time at which the another visual media is viewed by the user matches the time dependency.

* * * * *